United States Patent [19]

Hitomi

[11] Patent Number: 4,555,072
[45] Date of Patent: Nov. 26, 1985

[54] DRAG MECHANISM FOR A SPINNING REEL

[75] Inventor: Yasuhiro Hitomi, Sakai, Japan

[73] Assignee: Shimano Industrial Company Limited, Osaka, Japan

[21] Appl. No.: 586,717

[22] Filed: Mar. 6, 1984

[30] Foreign Application Priority Data

Mar. 10, 1983 [JP] Japan .................................. 58-35034

[51] Int. Cl.⁴ ....................... A01K 89/01; A01K 89/02
[52] U.S. Cl. ............................................... 242/84.5 R
[58] Field of Search ..................... 242/84.5 P, 84.5 A, 242/84.51 A, 84.5 R, 84.51 R, 211, 212, 213, 214, 216, 217, 218, 219, 220, 84.1 R

[56] References Cited

U.S. PATENT DOCUMENTS 3,432,114  3/1969  Meisner ............................... 242/214
4,133,499  1/1979  Purcell ................................. 242/217
4,391,419  7/1983  Iwama et al. ................... 242/84.5 P Primary Examiner—Billy S. Taylor
Attorney, Agent, or Firm—Stevens, Davis, Miller & Mosher

[57] ABSTRACT

A drag mechanism for a spinning reel includes a first friction plate supported non-rotatably to the spool shaft and a second friction plate disposed adjacent to the first friction plate and supported non-rotatably to the reel body. An adjusting knob is screwed with the reel body, such that the adjusting knob is rotatable relative to the reel body. The range of rotation of the adjusting knob relative to the reel body is restricted. The adjusting knob includes a spring holder for holding a drag spring which is interposed between the first and second friction plates and an initial load adjuster. The initial load adjuster is movable toward or away from the friction plates to adjust an initial rotational resistance load applied against rotation of the spool shaft by the adjusting knob. The initial load adjuster also includes a display means for displaying an indication of the initial load set by the initial load adjuster.

6 Claims, 6 Drawing Figures

DRAG MECHANISM FOR A SPINNING REEL

FIELD OF THE INVENTION

This invention relates to a drag mechanism for a spinning reel, and more particularly to a drag mechanism for a spinning reel having a spool shaft supported to a reel body such that it is movable longitudinally thereof and rotatable, the drag mechanism having first friction plates supported non-rotatably to the spool shaft, second friction plates disposed adjacent to the first friction plates and supported non-rotatably to the reel body, an adjusting knob supported rotatably to the reel body, and a drag spring, so that the adjusting knob is operated to adjust a braking force applied to the spool shaft through the friction plates and the drag spring.

BACKGROUND OF THE INVENTION

Conventionally, the above type of drag mechanism has been disposed in U.S. Pat. No. 4,391,419. The drag mechanism is provided at the rear of the reel body with an adjuster which urges first and second friction plates to adjust an initial rotational load applied against rotation of the spool shaft and with an adjusting knob so that the braking force applied to the spool shaft is desirably adjustable relative to its minimum value, i.e., within a range from a minimum to a maximum value. The adjusting knob is axially movable and rotatable relative to the adjuster, is connected integrally therewith at a desired position to rotate relative to each other, and is restricted to rotate only within a predetermined range with respect to the reel body. The adjuster is adjusted to obtain a desired load set as an initial rotation load for the spool shaft. In order for the drag mechanism to adjust the rotation start load for the spool shaft to a desired set load, the adjusting knob is rotated to be set in the minimum load point with respect to the load adjuster and then is made integral therewith, so that the adjuster is adjusted to obtain the desired set load, i.e., the initial rotation load.

In this case, however, the adjusting knob is required to be released from engagement with the adjuster and to be set to its minimum or maximum load position. Also, in order to rotate the adjuster, the adjusting knob is required to connect therewith and thereafter be set in minimum load position. In other words, it is necessary that the adjusting knob first be released from the engagement with adjuster, set in the minimum or maximum load position, and thereafter reconnected to the adjuster, so that the adjuster rotates through the adjusting knob to set the rotation start load and the adjusting knob is reset in the minimum load position, thereby creating a problem of troublesome load setting. Also, an angler, even when he intends to reduce the rotation start load or to increase the maximum load therefor, adjusting the range of adjustment of the braking force cannot be rapidly changed corresponding to a sudden hooking of a fish, thereby causing a break in the fishing line or an escape of the hooked fish. Furthermore, a lack of any display of the amount of the set load causes the angler to be uninformed of the intensity of adjusted load.

SUMMARY OF THE INVENTION

An object of the invention is to provide a drag mechanism for a spinning reel, which has an adjusting knob screwed with a reel body and an adjuster which adjusts an initial load applied against rotation of a spool shaft and which moves toward or away from first and second friction plates so that the initial load applied against rotation of the spool shaft can be simply adjusted to be set for any position of the adjusting knob and wherein the set value of the initial rotation load and the adjusting position of the knob are easy to read.

This invention is characterized in that the drag mechanism, which gives a resistance to rotation of a spool shaft journalled to the reel body, is provided with first friction plates supported non-rotatably to the spool shaft, second friction plates adjacent to the first friction plates respectively and supported non-rotatably to the reel body, an adjusting knob screwed with the reel body, and a drag spring applying a braking force against the friction plates. The drag mechanism is provided with a restriction means for restricting a rotation range of the adjusting knob, a spring holder provided at the adjusting knob for holding the drag spring, and an initial load adjuster movable toward or away from the friction plates in order to adjust the rotation start load applied against rotation of the spool shaft, so that the initial load adjuster desirably adjusts the rotation start load on the spool shaft by use of the adjusting knob.

Accordingly, the initial load adjuster only operates to easily adjust the rotation start load on the spool shaft with respect to any adjusting position of the adjusting knob and the adjusted value is always displayed at an easily viewed location between the adjuster and the adjusting knob.

The above and other objects and features of the invention will be more fully apparent hereinafter from a consideration of the following description taken in connection with the accompanying drawings.

DRIEF DESCRIPTION OF THE INVENTION

FIG. 1 is a sectional front view of an embodiment of a drag mechanism for a spinning reel of the invention, FIG. 2 is a sectional view taken on the line X—X in FIG. 1, FIG. 3 is an illustration of a first display means for an initial load set by an adjuster therefor, FIG. 4 is an illustration of a second display means for displaying an adjusting position of an adjusting knob, and FIGS. 5 and 6 are illustrations of modified embodiments of the invention.

DETAILED DESCRIPTION OF THE INVENTION

Figure 1:
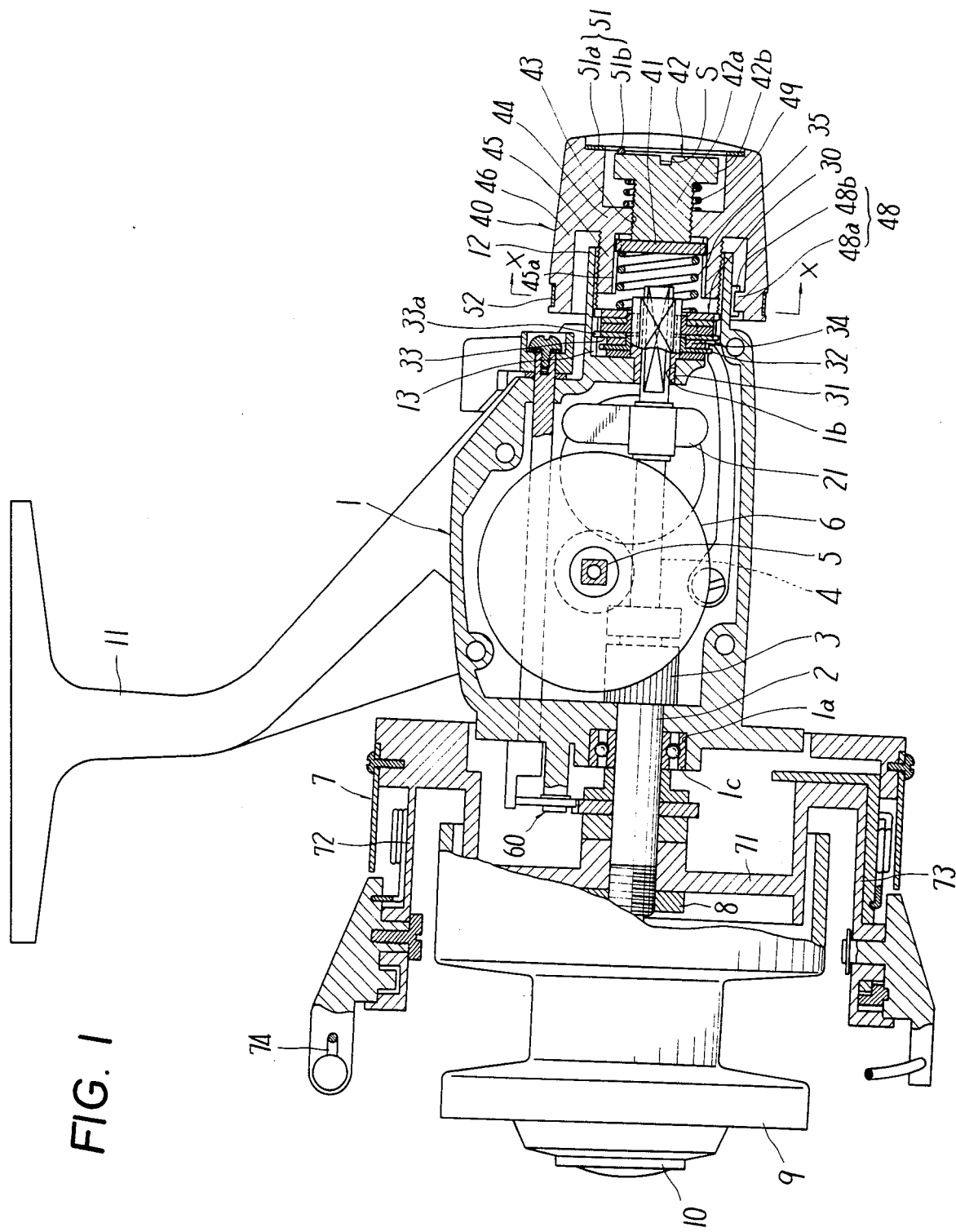
Figure 2:
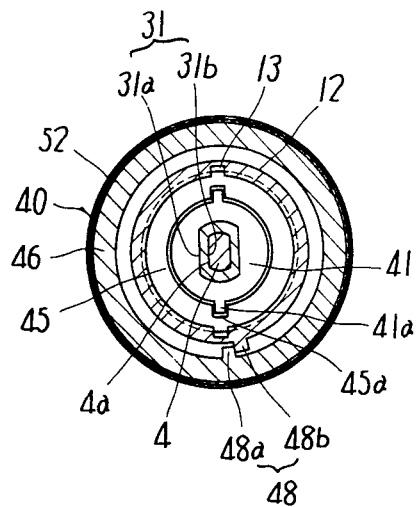

Referring to FIGS. 1 and 2, a spinning reel incorporating therein the drag mechanism of the invention is shown, in which reference numeral 1 designates a reel body having at the upper wall a mounting leg 11 for a fishing rod and at the front and rear walls through-bores 1a and 1b respectively, 2 designates a tubular shaft supported rotatably into the through-bore 1a through a bearing 1c, and 4 designates a spool shaft supported to the reel body 1 such that it is movable longitudinally thereof and rotatably relative thereto. A pair of shaft bores are provided at both lateral side walls of reel body 1 and perpendicular to the axis of tubular shaft 2 so that a handle shaft 5 having a handle (not shown) is journalled to the side walls and carries a master gear 6 at the projection in the reel body 1.

The tubular shaft 2 enters at one end into the reel body 1 and comes out at the other end therefrom and has at the one end a pinion 3 engageable with the master gear 6 and at the other end a rotary frame 7 provided with a disc-like body 71 having a through bore for the tubular shaft 2 and a pair of arms 72 and 73 carrying a bail arm 74. Rotary frame 7 is fixed to the tubular shaft 2 by use of a lock nut 8.

The spool shaft 4 passes through the tubular shaft 2, enters at one end into the reel body 1, and projects at the other end outwardly therefrom, so that a spool 9 is sleeved on this other end of shaft 4 and is screwably tightened thereto by a tightening nut 10. A reciprocation mechanism 21 for the spool shaft 4 is provided between the handle shaft 5 and the spool shaft 4 within the reel body 1. A drag mechanism 30 according to the invention is provided for exerting braking action with respect to rotation of spool shaft 4.

The drag mechanism 30 is so constructed that a support cylinder 12 extends from the rear wall of reel body 1 around the through bore 1b, a pair of guide grooves 13 are formed at the inner periphery of and extend longitudinally of reel body 1, and into the through bore 1b is insertably and rotatably mounted a rotary cylinder 31 having a larger diameter support portion which extends rearwardly and has a not-round outer periphery 31a and a not-round inner periphery 31b. The spool shaft 4 is provided at the rear portion with a not-round outer periphery 4a corresponding to the not-round inner periphery 31b, the not-round outer periphery 4a being inserted onto the not-round inner periphery 31b such that rotary cylinder 31 and spool shaft 4 are axially movable but non-rotatable relative to each other. First and second friction plates 32 and 33 are juxtaposed axially alternately between the support cylinder 12 at the reel body 1 and the larger diameter portion at the rotary cylinder 31, and linings 34 are interposed between the respective alternately disposed first and second friction plates 32 and 33 and are also positioned in front of the first friction plates 32 in relation of being rotatable and axially movable. The first friction plates 32 each have a not-round center bore corresponding to the not-round outer periphery 31a of rotary cylinder 31 and are inserted non-rotatably and axially movably thereon. Second friction plates 33 each have guide segments 33a extending radially outwardly and slidably inserted into the guide grooves 13 to thereby be supported non-rotatably and axially movably to the support cylinder 12.

An adjusting knob 40 is screwed with the support cylinder 12 in relation of being movable longitudinally forwardly and backwardly of reel body 1 and a drag spring 35' for biasing both of the friction plates to apply a braking force against the rotation of spool shaft 4' is interposed between the adjusting knob 40 and the last second friction plate 33.

In the spinning reel constructed as foregoing, this invention is so designed that a restriction means 48 for restricting the rotation of adjusting knob 40 with respect to the reel body 1 is provided between the adjusting knob 40 and the reel body 1. Initial load adjuster 42 is mounted to adjusting knob 40 primarily through a screw means. Load adjuster 42 has a spring holder 41 for the drag spring 35, is axially movable toward or away from the friction plates 32 and 33 and operates to adjust the initial load applied against rotation of spool shaft 4.

The adjusting knob 40 in this embodiment is provided at a longitudinally intermediate portion thereof with a disc-like support 44 having a threaded bore 43 screwable with the initial load adjuster 42. The front of the support 44 includes an inner cylinder 45 extending frontward and screwable with the support cylinder 12. The outside of inner cylinder 45 includes an outer cylinder 46 locating radially outside support cylinder 12 and extending in parallel thereto.

The restriction means 48 comprises a projection 48a extending radially inwardly from the inner periphery of outer cylinder 46 and a projection 48b extending radially outwardly from the outer periphery of support cylinder 12, the inward projection 48a and outward projection 48b being engageable with each other. The restriction means 48 restricts a rotation range of adjusting knob 40 to about one rotation of inward projection 48a from its engaging position with the projection 48b until their reengagement.

The inner cylinder 45 at the adjusting knob 40 includes at its inner periphery a pair of guide grooves 45a extending axially of cylinder 45, and a spring holder 41, as shown in FIG. 2, is formed of a disc insertable into the inner cylinder 45 and the outer periphery of the disc includes two projections 41a slidably engageable with the guide grooves 45a. Thus disc-shaped spring holder is axially movable with respect to the inner cylinder 45 and non-rotatable relative thereto, and holder 41 functions to hold drag spring 35.

The initial load adjuster 42 has a screw thread 42a screwable with the threaded bore 43 at the support 44 of adjusting knob 40 so that forward screwing of adjuster 42 pushes the spring holder 41 forwardly. Adjuster 42 also has a head 42b larger in diameter than the screw thread 42a, and an operating groove S provided at the head 42b. Also, between the head 42b and the support 44 is interposed a spring 49 for locking the adjuster 42. Thus, the head 42b is operated through the groove S to change a biasing force by the drag spring 35 against the friction plates 32 and 33, thereby enabling the rotational starting load for spool shaft 4 to be adjusted.

Figure 3:
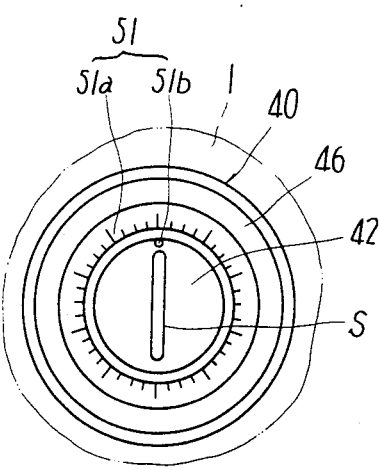

Between the initial load adjuster 42 and the adjusting knob 40, a first display means 51, as shown in FIGS. 1 and 3, is provided for displaying the initial load set by the initial load adjuster 42. First display means 51 comprises a scale 51a for calibrating the initial load, with scale 51a being provided annularly at the rear end face of outer cylinder 46, and an indicator 51b provided on the surface of head 42b so that a set value of the initial load is displayed always by one marking at indicator 51b.

Figure 4:
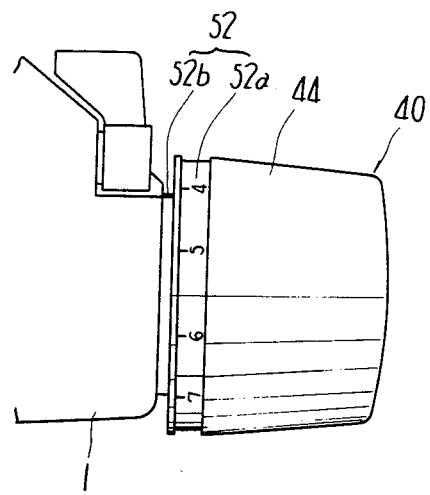

Also, a second display means 52 for displaying an adjusting position of the adjusting knob 40 is provided between the adjusting knob 40 and the reel body 1 as shown in FIG. 4 and comprises a scale 52a provided at the outer periphery of outer cylinder 46 at the reel body side and an indicator 52b at the reel body 1, so that the indicator 52b displays the adjustable value of the rotation start load.

In addition, in FIG. 1, reference numeral 60 designates an anti-reverse-rotation mechanism for the rotary frame 7.

In the above construction, the adjusting knob 40, when rotated from a minimum braking force to a maximum thereof, screws forward from the rearmost position to the foremost position with respect to the reel body 1, whereby the biasing force by the drag spring 35 applied to both the friction plates 32 and 33 increases to adjust the rotation start load of spool shaft 4 from the minimum to the maximum.

The initial load value of the rotation start load for the spool shaft 4 is adjusted by rotating the initial load adjuster 42 with respect to the adjusting knob 40, in other words, it screws forward or backward to increase or decrease the initial load value. Thus, the range of adjusting the rotation start load for the spool shaft 4 is adjusted to the maximum or minimum side.

Since the initial load adjuster 42 is operated to adjust the initial load with respect to the adjusting knob 40, the initial load is desirably and simply adjustable regardless of the adjusting position of adjusting knob 40 to the reel body 1 and also the value of the adjusted initial load is always readable by the first display means 51.

Alternatively, the rotation range of adjusting knob 40 by the restriction means 48 may be larger or smaller than one full rotation.

The adjusting knob 40 may alternatively comprise the inner cylinder 45 integral with the support 44 and detachably mountable to the main body of knob 40 including the outer cylinder 46.

Figure 6:
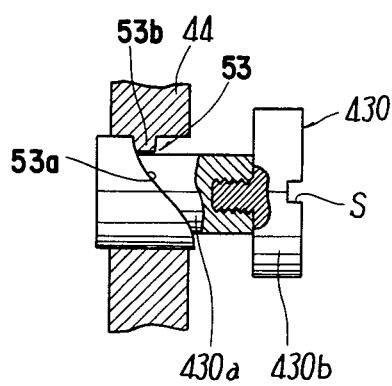
Figure 5:
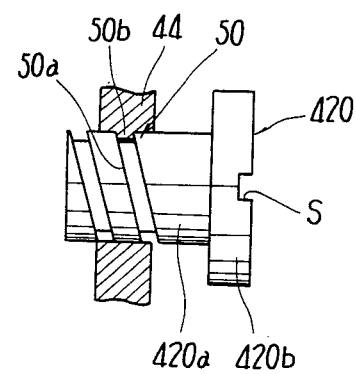

Also, the spring holder 41 may alternatively be integral with the end face of adjuster 42, and the initial load adjuster 42 may use a cam means 50 or 53 for moving toward or away from the friction plates. In this case, the cam means 50 or 53, as shown in FIGS. 5 and 6, comprises a cam face 50a or 53a at a cam shaft 420a or 430a of initial load adjuster 420 or 430 passing through support 44 at the adjusting knob 40 and a projection 50b or 53b engageable slidably with the cam face 50a or 53a and provided at the support 44, so that the cam face 50a or 53a in slidable engagement with the projection 50b or 53b, while the adjusting knob 420 is rotating, allows the adjuster 420 or 430 to move axially forwardly or backwardly. In addition, the cam means 50 and 53 in FIGS. 5 and 6 are not essentially different from each other, but the cam means 50 has a spiral cam face 50a and cam means 53 has a stepped cam face 53a. Also, the adjusters 420 and 430 have the heads 420b and 430b as shown in FIGS. 5 and 6, the head 430b being separate from a stem 430a and screwing integrally therewith through a screw means 430c. In addition, reference S designates an operating groove for the head 420b or 430b the same as in the former embodiment.

As seen from the above, this invention provides an adjusting knob and initial load adjuster which are movable toward or away from the friction plates so that the initial load value applied against rotation of the spool shaft is simply adjustable to any adjusting position of the knob and the adjuster value is easy to read.

While an embodiment of the invention has been shown and described, the invention is not limited to the specific construction thereof, which is merely exemplary in the specification rather than defined.

What is claimed is:

1. A drag mechanism for a spinning reel comprising a reel body, a spool and a spool shaft rotatable and movable longitudinally of said reel body, said drag mechanism for applying a resistance against rotation of said spool shaft and comprising: at least one first friction plate supported non-rotatably to said spool shaft, at least one second friction plate disposed adjacent to said first friction plate and supported non-rotatably to said reel body, an adjusting knob screwed with said reel body such that said adjusting knob is rotatable relative to said reel body, a drag spring, a restriction means for restricting a range of rotation of said adjusting knob with respect to said reel body, said adjusting knob including a spring holder for holding said drag spring, said drag spring being interposed between said first and second friction plates and an initial load adjuster, said initial load adjuster being movable toward or away from said friction plates to adjust an initial rotational resistance load applied against rotation of said spool shaft by said adjusting knob, said initial load adjuster including a display means for displaying an indication of said initial load set by said initial load adjuster.

2. A drag mechanism according to claim 1, wherein said initial load adjuster is supported to said adjusting knob by a screw means such that said initial load adjuster is movable toward or away from said friction plates independently of a rotational adjustment position of said adjusting knob.

3. A drag mechanism according to claim 1, wherein said initial load adjuster is supported to said adjusting knob by use of a cam means such that said initial load adjuster is movable toward or away from said friction plates independently of a rotational adjustment position of said adjusting knob.

4. A drag mechanism for a spinning reel comprising a reel body, a spool and a spool shaft rotatable and movable longitudinally of said reel body, said drag mechanism for applying a resistance against rotation of said spool shaft and comprising: at least one first friction plate supported non-rotatably to said spool shaft, at least one second friction plate disposed adjacent to said first friction plate and supported non-rotatably to said reel body, an adjusting knob screwed with said reel body such that said adjusting knob is rotatable relative to said reel body, a drag spring, a restriction means for restricting a range of rotation of said adjusting knob with respect to said reel body, said adjusting knob including a spring holder for holding said drag spring, and an initial load adjuster, said initial load adjuster being movable toward or away from said friction plates to adjust an initial rotational resistance load applied against rotation of said spool shaft by said adjusting knob, said initial load adjuster including a display means for displaying an indication of said initial load set by said initial load adjuster, said display means being disposed between said initial load adjuster and said adjusting knob.

5. A drag mechanism according to claim 1, wherein between said adjusting knob and said reel body is provided a display means for displaying an adjusting position of said adjusting knob.

6. A drag mechanism according to claim 4, wherein between said adjusting knob and said reel body is provided a second display means for displaying an adjusting position of said adjusting knob.

* * * * *